June 8, 1948. E. H. SCHMIDT 2,442,827
BOTTLE TRANSFERRING APPARATUS
Filed May 19, 1944 3 Sheets-Sheet 1
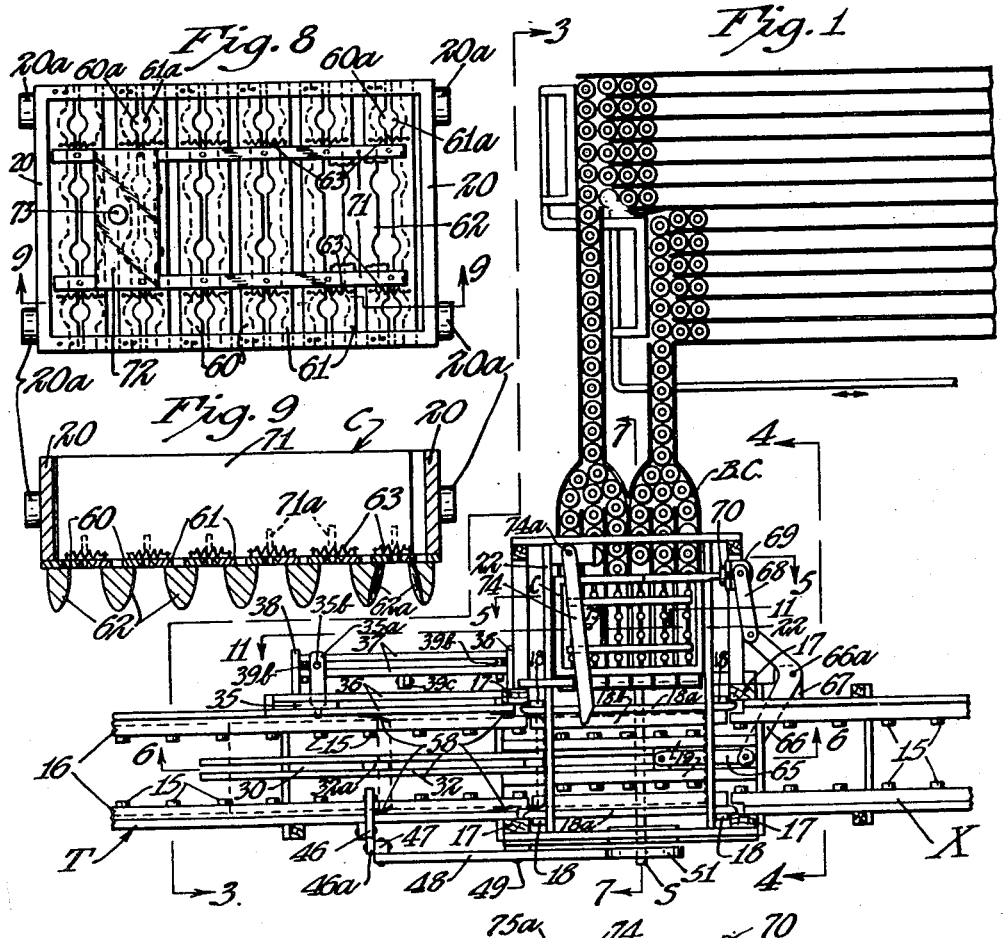
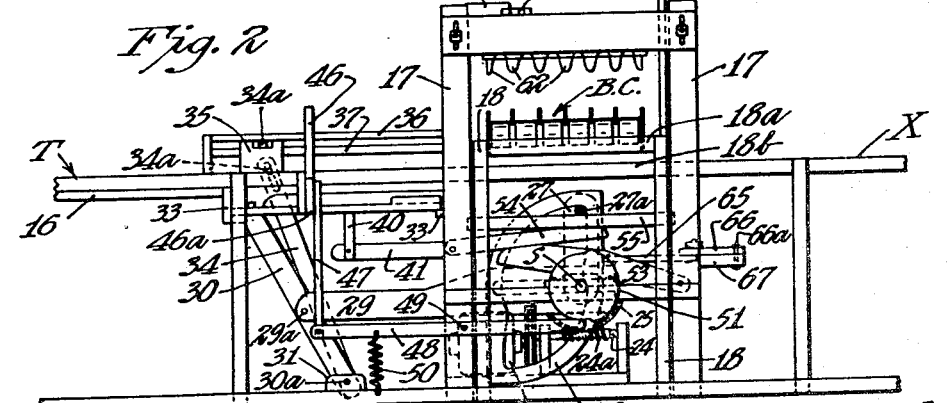
Inventor
Ernest H. Schmidt
By Williamson & Williamson
Attorneys

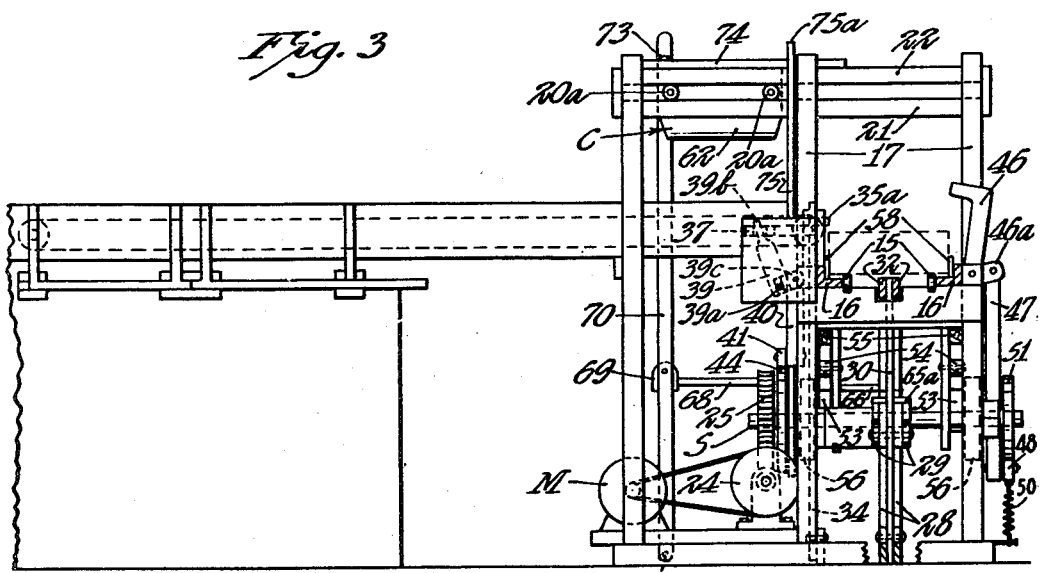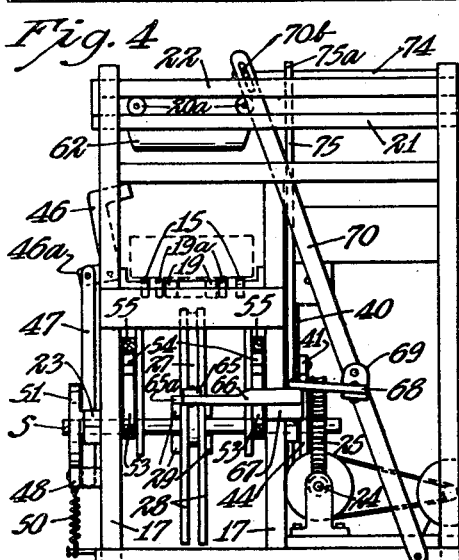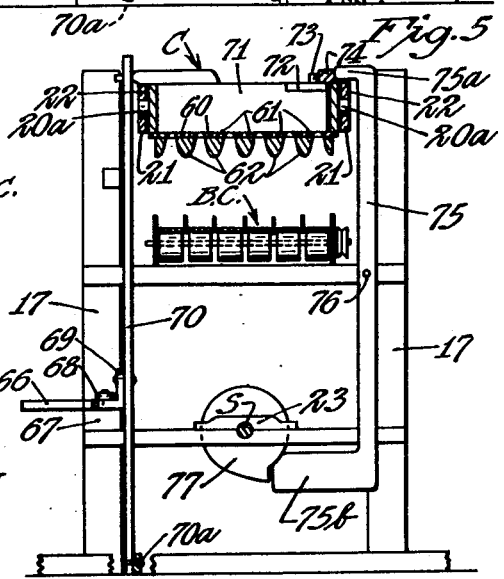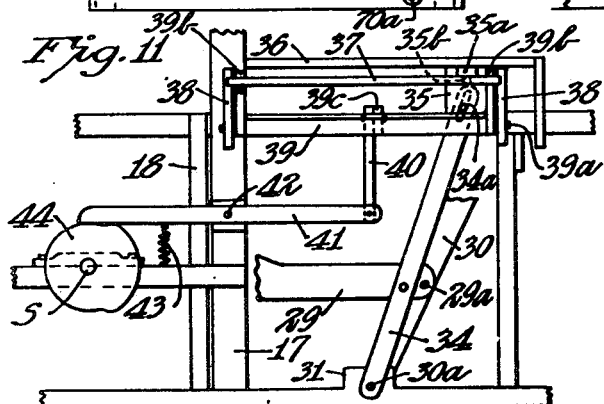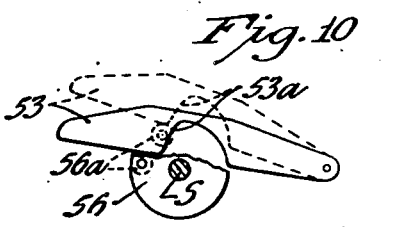

June 8, 1948. E. H. SCHMIDT 2,442,827
BOTTLE TRANSFERRING APPARATUS
Filed May 19, 1944 3 Sheets-Sheet 3
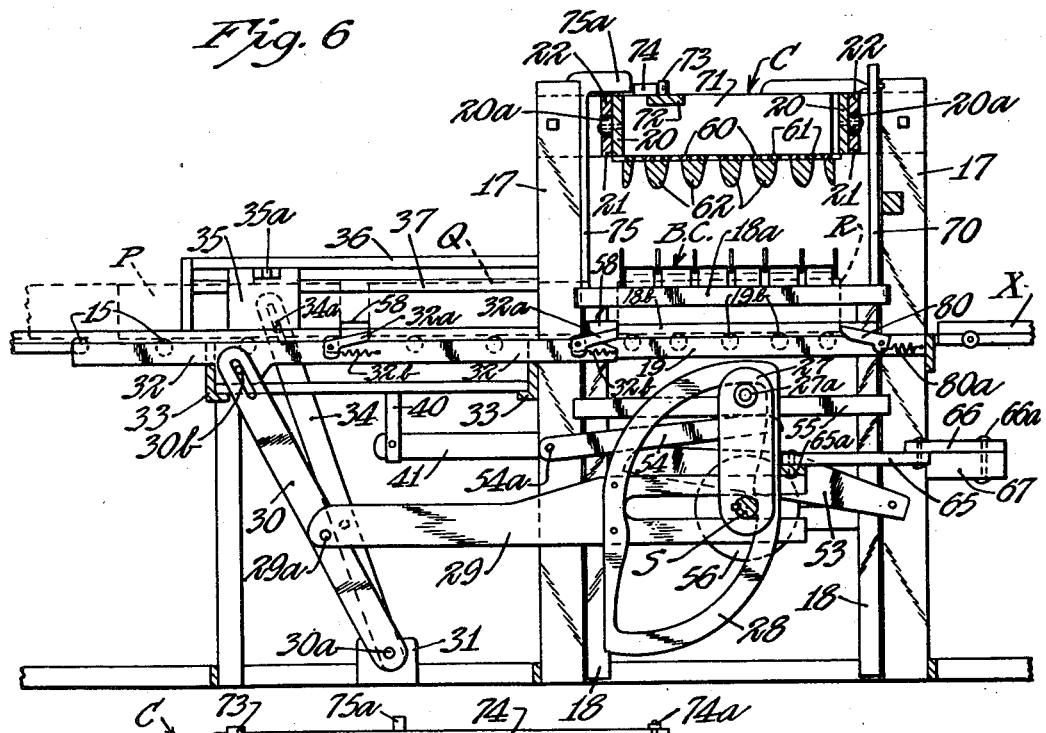
Fig. 6
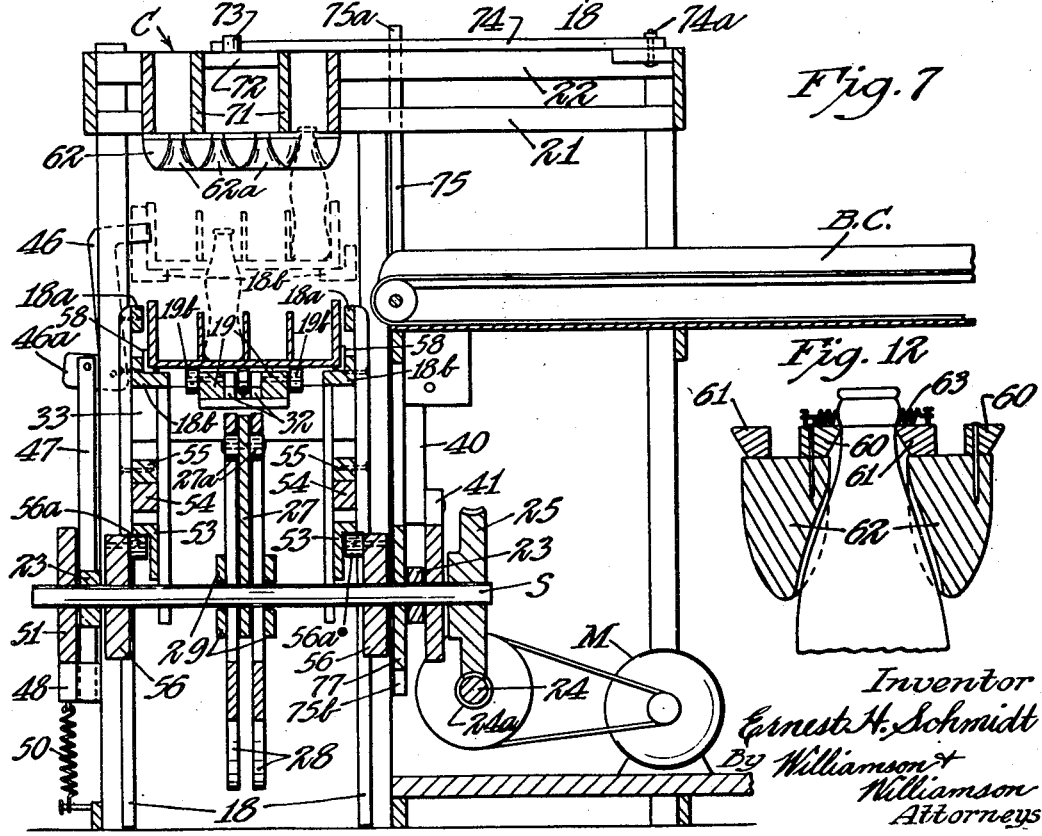
Fig. 7
Fig. 12
Inventor
Ernest H. Schmidt
By Williamson &
Williamson
Attorneys Patented June 8, 1948

2,442,827

UNITED STATES PATENT OFFICE 2,442,827

BOTTLE TRANSFERRING APPARATUS

Ernest H. Schmidt, Mankato, Minn.

Application May 19, 1944, Serial No. 536,314

7 Claims. (Cl. 214—1)

This invention relates to bottle handling apparatus and particularly to an efficient, high capacity machine or apparatus for handling cases containing empty bottles and for bodily removing the bottles from the empty cases and thereafter transferring such bottles to a receiving medium such as a platform, conveyor or hopper whereafter the bottles may be delivered for cleaning or refilling.

More particularly it is an object to provide a machine which preferably is operated from a single source of power and which will cause successive cases containing empty bottles to be delivered one at a time to an elevating platform which intermittently is raised and then quickly dropped to effect engagement of the upper and uncovered ends of the bottles therein, with a bottle grasping and transferring carriage which removes and releases the bottles upon a receiving medium, and which apparatus further makes provision for the continuous intermittent movement and delivery of the empty cases in the line for receiving newly filled bottles.

A further object is the provision of such a machine or apparatus where the various mechanisms necessary for such handling and transferal of bottles are all driven or actuated from a central operating shaft connected with a suitable source of power.

In the manufacture and bottling of beverages, such as the various soft drinks, as well as malt beverages, considerable effort, expense and labor has been encountered in removing the bottles from the cases in which they are returned and then feeding such removed bottles to cleaning and other mechanism. In most plants the handling and transferring of these bottles from the case is usually accomplished by manual labor or with crude discharging or dumping mechanism causing breakage as well as employment of a number of attendants.

With my improved apparatus the cases containing bottles as they are returned are moved by the usual roller chutes or conveyors in a line and the entire removal of the bottles from the case, delivery of the case and transportation of the bottles to the receiving medium is automatically accomplished, with the consumption of only a very small amount of power.

A further object is the provision of a simple, comparatively inexpensive method of transferring empty bottles from a case to a receiving medium.

These and other objects and advantages of my invention will be more apparent from the following description made in connection with the accompanying drawings, wherein like reference characters refer to the same parts throughout the several views, and in which—

Figure 1 is a plan view of an embodiment of my apparatus showing a multiplicity of the empty bottles removed from the case and deposited upon a receiving medium;

Figure 2 is a front elevation of the same;

Figure 3 is a section taken substantially on the line 3—3 of Figure 1;

Figure 4 is a cross section taken substantially on the line 4—4 of Figure 1, with the bottle grasping carriage moved back into position above the case-elevating platform;

Figure 5 is a vertical section taken on the line 5—5 of Figure 1;

Figure 6 is a vertical section taken on the line 6—6 of Figure 1, centrally of the track and elevating platform;

Figure 7 is a vertical section taken on the line 7—7 of Figure 1 in a plane intersecting the operating shaft, with the bottle grasping carriage positioned above the lifting platform;

Figure 8 is a top plan view of the bottle grasping carriage;

Figure 9 is a vertical section taken on the line 9—9 of Figure 8;

Figure 10 is a detail side elevational view showing the camming mechanism for elevating the platform;

Figure 11 is a vertical section taken on the line 11—11 of Figure 1 illustrating the case holdback mechanism;

Figure 12 is a detail cross section on a larger scale showing the cooperative guiding means and grasping elements applied to the upper end of an elevated bottle; and Figure 13 is a schematic diagram showing the operation of the various mechanisms during the four quarters of a complete cycle.

In the embodiment of my invention illustrated, my machine is associated with the delivery end of a conventional type of roller track T declined toward its delivery end for conveying cases containing bottles. The delivery end of this track is joined as shown in Figure 1 with the receiving end of a horizontal roller track provided by my machine which as shown comprises two series of rollers 15 journalled in suitable horizontal angle bars 16 which are secured to the post of the upright frame of my apparatus. The central portion of my machine is supported from four spaced upright posts 17 arranged in oblong relation. Within and guided by these four posts 17, I provide a case-elevating platform comprising four vertical legs 18 which are secured together and braced at front and rear by top cross bars 18a which act as side guides for a case to be elevated. The platform includes a pair of spaced angle bar supports 18b connecting the front and rear sets of legs 18 and having horizontal supporting surfaces adapted to engage the edges of a case as clearly shown in Figs. 1 and 7. The platform supporting angle bars 18b are mounted at such height relative to legs 18 that the horizontal supporting surfaces will be disposed a slight distance below the upper peripheries of the rollers 15 constituting the delivery track when the platform is in its lowermost or receiving position. The case delivery track is extended into the elevating platform as shown by providing spaced horizontal bars 19 which extend longitudinally of the leg section of the delivery track across the center of the open platform and which have mounted in the outer sides thereof, a series of case-supporting rollers 19b disposed at the same level as the rollers 15 of the first mentioned section of the delivery track. With the construction described, it will be seen that my skeleton or open work case-elevating platform may be bodily raised, suitable post engaging guiding elements being provided, and shifted from the position shown in full lines in Figure 7 to the dotted line position of case supporting members 18b.

At some distance above the supporting rails or angle bars 18b of the platform, is mounted a horizontally movable bottle grasping carriage indicated as an entirety by the letter C. This carriage, as shown, is of open box-like form and includes a pair of spaced side members 20 carrying on their outer sides, laterally projecting rollers 20a which are supported in a track provided, as shown by lower and upper horizontal rails 21 and 22, respectively. The said carriage track extends transversely of the two sections of the case delivery track previously referred to and approximately one-half of this carriage track is disposed directly above the case elevating platform, while the remainder of the track extends over a bottle-receiving medium, such as a conventional type of bottle conveyor BC which as shown comprises a series of individual endless belt conveyors trained about suitable pulleys and driven in conventional manner. It will, of course, be understood that any receiving media may be substituted including other types of conveyors as this receiving media constitutes no essential part of my invention.

In the embodiment of my invention illustrated, the several actuating mechanisms for operating the movable parts of my machine are all driven or otherwise moved from a single heavy operating shaft S which, as shown, is journalled in suitable bearings 23 mounted upon cross bars centrally of the front and back of the frame. Shaft S may be power driven in any suitable manner and as shown I provide an electric motor M connected for belt driving with a cross shaft 24 which has fixed thereto a worm 24a in mesh with a worm gear 25 fixed to the rear end of shaft S.

I provide mechanism driven by the operating shaft S for intermittently moving or projecting cases (as shown one at a time) from the rollers 15 of the delivery track to the rollers 19b positioned within the top of my elevating platform. To this end a rigid camming arm 27 is fixed centrally to operating shaft S, extending radially thereof and carrying adjacent its outer end a pair of aligned laterally projecting cam rollers 27a. Cam rollers 27a during the revolution of cam arm 27 engage and work against a pair of internal cam tracks 28 which are rigidly connected to the inner surfaces of a pair of horizontally extending elongated actuating arms 29 which are slotted at their rear portions for relative sliding movement on the operating shaft S and which have their forward portions pivotally connected by a pin 29a with a case-projecting lever 30. Lever 30 is journalled at its lower end upon a cross shaft 30a which as shown is mounted in suitable brackets 31 at the base of the frame. The upper end of case-projecting lever 30 is connected by slot and pin connections 30b with a case-projecting carriage 32 comprising a pair of spaced edgewise disposed bars 32. These two bars constituting the case projecting carriage are supported upon and guided by, a pair of transverse angle bars 33 which also serve to support the first section of the delivery track (see Figure 6) and they are guided along their sides by the members 19 of the inner track section above the platform being as shown in Figure 7 disposed between said track members 19.

A pair of spaced case-engaging dogs 32a are pivotally mounted between the two bar members of the carriage 32, spaced apart a distance slightly greater than the length of the rear case, one of said dogs being pivoted adjacent the inner or forward end of the carriage and the other being pivoted at the medial portion of the carriage, and both of these dogs being provided with suitable means, such as contractile springs 32b for normally urging their abutment ends upwardly into case-abutting position. The right hand or forward dog 32a as shown in Figure 6, during the proper portion of the cycle of operation as carriage 32 is projected inwardly, is adapted to project an empty case on the platform from which the bottles have been removed out of the machine to a chute or conveyor X, while the rearward dog 32a engages the rear end of a filled spaced case to project the same simultaneously to a position on the second track section comprising rollers 19b directly above the elevating platform.

In conjunction with the case-projecting mechanism just described, it is desirable to provide associated case-holding and spacing mechanism which as illustrated is constructed, as follows:

The projecting movement of the carriage 32 is somewhat greater than the length of a single case. For the purpose of assisting in spacing the cases a sufficient distance apart as they are progressively delivered upon the track sections and to provide for functioning of the dogs 32a, I provide an elongated lever 34 fulcrumed at its lower end to the same shaft 30a to which lever 30 is fulcrumed and having slot and pin connection at 34a with a sliding block 35 which is mounted in a horizontal guide 36 disposed some distance above the top of the adjacent or receiving portion of the track. Block 35 carries a laterally or inwardly projectable bottle engaging arm 35a which has a diminished end for engaging between two transverse rows of bottles when the carriage 32 and lever 34 are in the retracted positions illustrated in Figure 6. Bottle engaging arm 35a has its outer end provided with a depending pin 35b which is guided in a horizontal track comprising spaced members 37 mounted at the rear of the receiving portion of the machine (see Figure 1) and this track 37 is moved horizontally to project and retract the bottle engaging arm 35a during portions of the cycle of operation.

As shown, the ends of the bars 37 comprising the said track are slidably mounted in two upstanding fixed arms 38 (see Figure 11) suitable opposing grooves being formed adjacent the upper ends of said arms. A pivoted transverse yoke member 39 is disposed below track bars 37 having its elongated horizontal portion provided with trunnions 39a which, as shown, are pivoted in the lower ends of the rigid arms 38. The upstanding arms of yoke member 39 are diminished at their upper ends to provide track moving fingers 39b extending between the two bars of the track 37 adjacent the respective ends thereof and having slidable relation with said track bars. The base member of yoke 39 carries a laterally and inwardly projecting bracket 39c (see Figures 1, 3 and 11) which has pivoted thereto a depending actuating link 40, the lower end of which is pivoted to a more or less horizontally extending elongated lever 41 which is fulcrumed at its medial portion on a pin 42 and which has its opposite end resiliently urged into engagement by a contractile spring 43 with a somewhat pear-shaped cam 44, cam 44 being fixed to the operating shaft S. Thus it will be seen by reference to Figures 1, 3 and 11 that during a portion of the cycle of revolution of operating shaft S the high or right hand portion of cam 44, as shown in Figure 11, will swing lever 41 thereby through link connection 40 causing the transverse yoke member 39 to swing in clockwise movement as viewed in Figure 3, the track-engaging fingers 39b then moving the track 37 inwardly toward the case handling track of my machine.

Cooperating with the mechanism just described is a case-hold back arm 46 (see Figures 1 to 4 inclusive), said arm being of inverted L shape and pivoted at its lower end to a horizontal portion of the frame. The hold back arm 46 at its lower end is formed as a bell crank lever having a short angularly disposed bell crank arm 46a projecting outwardly from the frame which has pivotally secured thereto an operating link 47, the lower end of which is pivoted to a more or less horizontal extending lever 48 which extends longitudinally of the track portion of the machine. Lever 48 is fulcrumed on a pin 49 at its medial portion and has its inner end resiliently urged by contractile spring 50 against the underside of a pear-shaped cam 51 also fixed to the operating shaft S but on the opposite end thereof from the pear-shaped cam 44 previously described. It will be seen that during a portion of the cycle of revolution of shaft S when the actuated end of lever 48 rides the high sector of cam 51, that the link 47 will be moved upwardly thereby swingably projecting the case-holding arm 46 (see Fig. 3) in position to engage behind the rearward portions of the bottles of one case and forward of the transverse row of bottles of the next rearward case to hold that case back.

To prevent the successive cases from shifting backwardly, as they are intermittently projected along the roller track and spaced a proper distance apart, I provide two sets of spring catches 58 (see Figs. 1, 3, 6 and 7) which may be leaf springs attached at their outer ends and having their inner ends free and somewhat inturned to abut the rear end of a case as it is passed by such members.

To intermittently raise and lower a case containing bottles disposed on the inner track section comprising rollers 19b, I provide mechanism for bodily reciprocating my case-elevating platform mounted on the legs 18. To this end a pair of spaced transversely disposed, cam-actuated lifting levers 53 are pivoted at their outer ends to two of the heavy frame posts 17 and extend most of the distance across the platform space, engaging beneath the free ends of a pair of lifting arms 54 which are pivoted at their outer ends on pins 54a to the opposite supporting posts 17. Lifting arms 54 bear directly against cross bars 55 which are rigidly fixed horizontally and transversely to the upper portions of the platform legs 18. For actuating the lifting levers 53, I provide a cam mechanism as shown comprising two discs 56 (see Figures 6 and 10), fixed inwardly some distance from the respective ends of the operating shaft S, said discs carrying axially aligned cam rollers 56a which are adapted to engage a profile cam track 53a formed in the lower edge of the lifting arms 53. It will be noted (see Figure 10) that with the discs 56 rotating clockwise that during approximately one-fourth of the revolution of shaft S the lifting arms 53 are raised, elevating the platform and, of course, the case which is then supported thereon and thereafter the arms are suddenly dropped when the cam rollers arrive at the upwardly extending nearly vertical portion of the profile track 53a, the cam thereafter not affecting movement of the lifting bars during travel of the cam rollers over the arcuate section of the profile tracks.

Referring now in detail to the construction of my bottle grasping carriage C, I provide a plurality of series of cooperating bottle grasping slats forming the bottom of the box-like carriage C, one of the slats 60 of each series being rigidly fixed to the bottom edge of the box-like frame and the other slat 61 of each series being horizontally movable laterally of the first slat of the pair, and being slidably supported on the top of transversely disposed spaced guiding bars 62 which depend from and are secured to the rigid slats 60. The guiding bars 62 have depending portions of egg-shaped cross section, as clearly shown in Figure 6, 9 and 12, and extend fully across the bottom of the frame. These bars are concaved at appropriate portions to form concave guiding means properly shaped for the upward guiding movement of all of the individual bottles of a case disposed therebelow upon the elevating platform. By reference to Figure 12, the shape of the concave portions and general shape of the bars is shown with a bottle guided thereby into retained position between two of the slats 60 and 61. The slats 60 and 661 of each pair are provided with opposed semi-circular cooperating recesses 60a and 61a of proper radius to slip beneath the external lip of the respective bottles when the bottles are raised by elevation of the platform and when the movable slats of each pair are urged toward abutting position with respect to the stationary slat of each pair. As shown, contractile springs 63 are provided, two for each set of cooperating slats adjacent the ends thereof, one end of each of said springs being secured to one of the stationary slats and the opposite end being secured to the cooperating slidable slat.

The bottle neck receiving portions of the several sets of cooperating slats are positioned and accurately formed for precise alignment with the upper ends of the empty bottles contained in a case elevated by my said case-elevating mechanism.

It will be noted by inspection of Figure 12 that the opposing edges of the two cooperating slats 60 and 61 are oppositely beveled converging from their undersides to their tops to enable a proper opening cam action to be obtained when the bottles are elevated upwardly into engagement therewith.

The carriage C, as has been previously stated, is positioned directly above my case-elevating platform during part of the cycle of operation when the lifting and dropping mechanism is operated. I provide carriage shifting mechanism actuated by rotation of the operating shaft S for intermittently moving carriage C from bottle receiving position into the bottle discharging position, above the receiving medium BC as shown in Figure 1. The mechanism is directly actuated by the reciprocating movement of the large horizontal slotted actuating arms 29 which it will be recalled actuate the case-projecting mechanism. In the embodiment shown a short horizontal link 65 is pivoted at its inner end to a short cross piece 65a fixed across the inner ends of the slotted portions of the actuating arms 29 (see Figures 4 and 6) the outer end of said link being pivoted to the longer end of a horizontally disposed bell crank lever 66 which is fulcrumed by vertical pin 66a mounted on a suitable bracket 67 at the right hand end of the main frame. The shorter end of bell crank lever 66 is pivoted to a link 68 extending rearwardly of the machine and the other end of this link is pivoted to an angle bracket 69 which has an upstanding vertical flange to which is pivoted an elongated upstanding operating lever 70. Operating lever 70 is pivoted by pin 70a at its lower end to the base at the right hand side of the frame and has its upper end connected by slot and pin connection 70b to a cross pin fixed to one of the upper edges of a side of the carriage C. From the preceding description of the carriage operating mechanism, it will be seen that during the portion of the operating cycle when the case projecting mechanism is actuated through inward movement of the slotted pair of actuating bars 29, simultaneously bell crank lever 66 will be swung to operate the elongated upstanding operating lever 70 swinging the same forwardly at its upper end to the position shown in Figure 4 and thereby moving the carriage C from bottle discharging position above the receiving medium into extreme forward position directly above the case-elevating platform.

In the fourth cycle of operation which follows the movement of the bottle grasping carriage C above the receiving medium, simple mechanism is provided for releasing the multiplicity of transferred bottles by retraction of the slidable bottle grasping slats 61. To this end I provide a pair of spaced slat-operating bars 71 extending substantially the full height of the box-like carriage and edgewise disposed above the cooperating slats, said bars carrying an appropriate number of spaced depending pins 71a each of said pins being disposed between the opposing edges of a pair of cooperating slats 60 and 61 and the two operating bars 71 being shiftable in unison to spread the cooperating slats for release of the grasped bottles. The operating bars 71 are shifted simultaneously by a transverse top plate 72 fixed thereto which plate carries an upstanding abutment roller 73 which is in abutment with a horizontally disposed operating arm 74 having its rear end pivoted by pin 74a to a suitable bracket disposed near the top and the rear of the machine frame. The free end of arm 74 extends across the top of the carrier C. Arm 74 is actuated by the inwardly extending end 75a of an upstanding elongated lever 75 which is pivoted at its medium portion on a pin 76 to a rear member of the frame and which has an inturned cam-engaging arm 75b at the lower end thereof which rides an eccentric cam 77 fixed adjacent the rear end of the operating shaft S. The contractile action of the several springs 63 for urging the slidable slats against the stationary slots serve to maintain the abutment of the actuating arm 74 against the upstanding roller 73 and further serve to cause the cam-engaging arm 75b of the lever 75 to ride the eccentric cam 77.

Operation

In the operation of my improved machine, cases containing empty bottles (as shown twenty-four in number) in conventional nested relation, are successively delivered in abutting relation along the delivery conveyor or roller chute 32. With the mechanism of my machine positioned as shown in Figures 1 and 6 a case P is shown held in a predetermined position prior to projection into my machine by means of the case-hold-back arm 46 which engages the front transverse series of bottles at their top portion. A second case Q indicated by dotted lines is shown in advanced spaced relation to the case P supported on track rollers 15 just to the left hand side of the elevating platform and a third case R is shown supported on the track rollers 19b which are disposed within the skeleton top of the platform. The bottle grasping carriage C at this time is positioned above the bottle receiving medium BC and the case projecting mechanism is retracted ready for operation.

In the first quarter of the operating cycle, which in the embodiment shown means the first quarter of rotation of operating shaft S, the two slotted actuating arms 29 of the case projecting apparatus are moved rearwardly, thereby through levers 30, actuating the case projecting carriage comprising members 32 and with the assistance of the dogs 32a projecting the empty case R above the platform, out of the machine on to the case receiving conveyor X and simultaneously projecting the case Q upon the track rollers 19b directly above the platform and spaced a very slight distance above the lifting edges or bars 18b of the platform. The case is thus precisely positioned for alignment of the bottle necks with the grasping mechanism of carriage C, by engagement of the outer end thereof against the inner end of a dog 80 which as shown is pivoted to a part of the frame and is spring actuated by contractile springs 80a.

Simultaneously with the projection of the cases, the carriage C is moved, by its operating mechanism including lever 70 with its bell crank connection with the slotted case-projecting actuating-arms 29 to the position shown in Figures 4 and 7, directly above the platform.

In the next or second quarter of the cycle of operation, the platform is bodily lifted by the camming mechanism including the cam rollers 56a working against the profile cam tracks 53a at the lower edge, of the lifting levers 53. As the platform lifts, the upper ends of the bottles are projected into the normally closed cooperating bottle grasping elements and in such operation the necks are accurately guided by the depending guiding ribs and the concave surfaces formed therein and force apart the several sets of cooperating slats 60 and 61 causing the bottles to be engaged and grasped just below their lips on the necks. Immediately thereafter through the cam action the platform is dropped back to normal lowermost position.

In the next or third quarter of the cycle of operation the carriage C is shifted outwardly to a position above the receiving medium or bottle conveyor BC, this being accomplished by the retraction through cam action of members 27 and internal cam 28, of the two parallel case-projecting actuating arms 29 and their connection through links 65 with the bell crank lever 66 and the actuating upright lever 70 connected therewith. With the retraction of the slotted actuating arms 29 the case-projecting mechanism, including the case-projecting carriage 32, is simultaneously retracted with the shifting of the bottle grasping carriage C outwardly.

In the last or fourth quarter of the cycle of operation the bottles are released from the grasping mechanism of the carrier through the actuating mechanism which includes the slat spreading bars 71 moved transversely through the abutment of the upstanding roller 73 with the horizontally swinging arm 74 which is in turn actuated by the upper and turned end 75a of the elongated actuating lever 75 operated by engagement at its lower end with the cam 77.

From the foregoing description it will be seen that I have provided an efficient, high capacity machine for progressively and continuously removing bottles from empty cases and thereafter transferring such bottles to a receiving medium. My apparatus in a bottling plant effects a marked economy in time and labor automatically doing the work formerly required of two or three attendants and in much less time.

It will, of course, be understood that various changes may be made in the form, details, arrangements and proportions of the parts without departing from the scope of my invention.

What I claim is:

1. Apparatus for transferring bottles from a case to a receiving medium having in combination a power operated shaft, a horizontal elevating platform, case-supporting means adjacent said platform, cam controlled mechanism actuated by said shaft for successively projecting cases containing bottles one at a time from said supporting means upon said elevating platform, a bottle grasping carriage movable horizontally above said platform, mechanism actuated from said operating shaft and synchronized with said case projecting mechanism for first moving said carriage above said platform and later away from said platform above a bottle receiving medium, said carriage having a series of bottle grasping elements alignable with the upper ends of said bottles when said carriage is in the first mentioned position, mechanism operated by said shaft for elevating said carriage to cause the individual bottles to be grasped by said grasping elements, and means actuated by said operating shaft for releasing said bottle grasping elements when said carriage has been moved to a position above said bottle receiving medium.

2. Apparatus for transferring bottles successively from a plurality of cases to a receiving medium, having in combination a horizontal case-receiving platform, a bottle receiving medium case delivery means at one side of said platform, mechanism for successively projecting cases containing bottles one at a time from said delivery means upon said platform, a bottle grasping carriage mounted for movement above said platform, mechanism connected with said carriage for shifting the same from a position to receive bottles above said platform to a position disposed above a bottle receiving medium, a revoluble operating member having a cam element affixed thereto, a cam operated reciprocating member mounted for substantially horizontal reciprocating movement and connected to actuate both said case-projecting mechanism and said carriage shifting mechanism, mechanism for successively producing relative vertical movement between said carriage and said platform, and said carriage having a multiplicity of bottle grasping elements in the lower portion thereof for individually grasping during said relative movement, the upper ends of bottles disposed in a case upon said platform.

3. The structure set forth in claim 2, another cam element connected with said revoluble operating member, and cam actuated means associated therewith for intermittently elevating said platform to produce said relative vertical movement.

4. The structure set forth in claim 2, and means associated with said case-projecting means for intermittently holding back a series of cases disposed in relation to be delivered to said case-receiving platform, said means including elements for spacing the ends of two successive cases apart a short distance prior to operation of said case-projecting means.

5. Apparatus for transferring bottles from cases to a receiving medium having in combination an operating shaft, a vertically movable case elevating platform a bottle receiving medium, a bottle grasping carriage, movable horizontally above said platform from a position in vertical alignment therewith to a discharge position, means driven by said operating shaft for successively projecting bottle containing cases, one at a time, upon said platform, means simultaneously operated from said operating shaft for shifting said carriage to receiving position above said platform, means connected with said operating shaft for vertically reciprocating said platform, bottle grasping means on said carriage having depending, cooperating guiding elements for receiving the neck ends of said bottles when a case is elevated, said bottle grasping means including for each bottle, a pair of spreadable elements, spring means for urging said elements together to grasp a bottle when the same is thrust upwardly against said guiding elements, and positive means connected for operation with said operating shaft to spread said cooperating elements apart when said carriage has been moved to discharging position, the various connections between said operating shaft and said several means being synchronized to project a case upon said platform and simultaneously align said bottle grasping carriage vertically with said case; to then elevate said platform with the said case thereon; to thereafter lower said platform to its original receiving position and to simultaneously move said carriage to a position above said receiving medium and to thereafter positively release said bottle grasping mechanism as said carriage is moved to extreme position over said receiving medium.

6. Apparatus for transferring bottles from a plurality of cases to a receiving medium, having in combination a horizontal elevating platform, case delivery means at one side of said platform, mechanism for successively projecting cases containing bottles from said delivery means upon said platform, a bottle grasping carriage mounted for shifting movement above said platform and having mechanism for individually grasping the upper ends of said bottles when said ends are projected upwardly into engagement therewith, mechanism for intermittently elevating said platform, a receiving medium removed from said platform, mechanism for intermittently moving said carriage away from alignment with said platform and over said receiving medium, means for positively releasing said bottle grasping mechanism when said carriage is moved over said receiving medium, power means for actuating all of said mechanisms, and actuating connections between said power means and said several mechanisms adapted to synchronize the operation of said mechanisms in a cycle to project a case upon said platform and simultaneously align said bottle grasping carriage vertically with said case; to then elevate said platform, thereby actuating the grasping mechanism through the upward movement of the upper ends of said bottles; to thereafter move said carriage away from alignment with said platform over said receiving medium and to simultaneously lower said platform to its original receiving position and to thereafter positively release said bottle grasping mechanism as it is moved into position over said receiving medium.

7. In bottle transferring apparatus, a vertically movable case elevating platform adapted to support in a predetermined position, a case containing upstanding prearranged bottles, a bottle grasping carriage movable horizontally from a position in vertical alignment with said platform to a removed discharge position, mechanism for elevating said platform while said carriage is in vertically aligned position thereto, mechanism for shifting said carriage to its discharge position simultaneously with the lowering of said platform, bottle grasping means on said carriage having depending cooperating guiding elements for receiving the neck ends of said bottles when a case is elevated, said bottle grasping means including for each bottle, a pair of spreadable elements, spring means for urging said elements together, positive means for intermittently spreading said cooperating elements apart when said carriage has been moved completely to discharging position, power means and synchronized connections between said power means and said platform, elevating mechanism and between said power means and said carriage shifting mechanism to cause a case on said platform to be elevated while said bottle grasping carriage is vertically aligned therewith and to then cause said platform to be lowered while substantially simultaneously, said carriage is moved out of alignment therewith to discharging position.

ERNEST H. SCHMIDT.

REFERENCES CITED

The following references are of record in the file of this patent:

UNITED STATES PATENTS

| Number | Name | Date |
|---|---|---|
| 1,620,778 | Odom | Mar. 15, 1927 |
| 1,904,720 | Douglass | Apr. 18, 1933 |
| 1,979,763 | Olson | Nov 6, 1934 |
| 2,031,866 | Thums | Feb. 25, 1936 |
| 2,119,725 | Stecher | June 7, 1938 |
| 2,253,283 | Minaker | Aug. 19, 1941 |
| 2,281,730 | Thompson | May 5, 1942 |
| 2,335,613 | Sayer | Nov. 30, 1943 |